(12) United States Patent
Iffergan

(10) Patent No.: US 7,245,810 B2
(45) Date of Patent: Jul. 17, 2007

(54) FIBER OPTIC CABLE FASTENER

(76) Inventor: David Iffergan, 8018 Agora Cir., Sugarland, TX (US) 77477

( * ) Notice: Subject to any disclaimer, the term of this patent is extended or adjusted under 35 U.S.C. 154(b) by 28 days.

(21) Appl. No.: 10/998,622

(22) Filed: Nov. 30, 2004

(65) Prior Publication Data
US 2006/0115228 A1    Jun. 1, 2006

(51) Int. Cl.
*G02B 6/00* (2006.01)
(52) U.S. Cl. .................. 385/136; 385/137; 385/147; 385/83
(58) Field of Classification Search ........... 385/134, 385/137, 147
See application file for complete search history.

(56) References Cited

U.S. PATENT DOCUMENTS

| 4,106,849 | A | * | 8/1978 | Stieff | 385/115 |
| 4,399,430 | A | * | 8/1983 | Kitchen | 340/550 |
| 4,688,024 | A | * | 8/1987 | Gadde | 340/550 |
| 4,729,626 | A | * | 3/1988 | Stieff | 385/115 |
| 5,434,557 | A | * | 7/1995 | Alizi | 340/555 |
| 5,441,239 | A | * | 8/1995 | Watson | 256/1 |
| 5,526,455 | A | * | 6/1996 | Akita et al. | 385/93 |
| 7,177,518 | B2 | * | 2/2007 | Chun | 385/136 |
| 2005/0254767 | A1 | * | 11/2005 | Chun | 385/136 |

* cited by examiner

*Primary Examiner*—Frank G. Font
*Assistant Examiner*—Guy G. Anderson
(74) *Attorney, Agent, or Firm*—Barnes & Thornburg LLP

(57) ABSTRACT

A secure fastener for joining fiber optic cables, is presented. The fastener includes a first segment having a first plurality of grooves to accommodate portions of the fiber optic cables, a first plurality of posts, a first plurality of apertures, and a first raised contoured portion and a second segment having a second plurality of grooves to accommodate portions of the fiber optic cables, a second plurality of posts, a second plurality of apertures, and a second raised contoured portion. The first plurality of posts of the first segment cooperates with the second plurality of apertures of the second segment and the second plurality of posts of the second segment cooperates with the first plurality of apertures of the first segment to secure the first and second segments to each other to form the fastener. The first and second raised contoured portions are configured to damage the fiber optic cables if the fastener is tampered with.

14 Claims, 6 Drawing Sheets

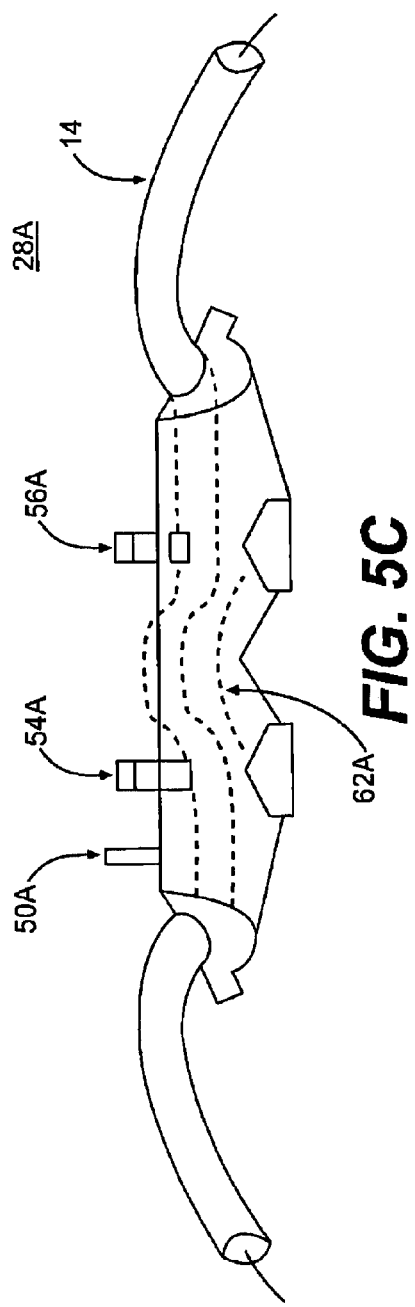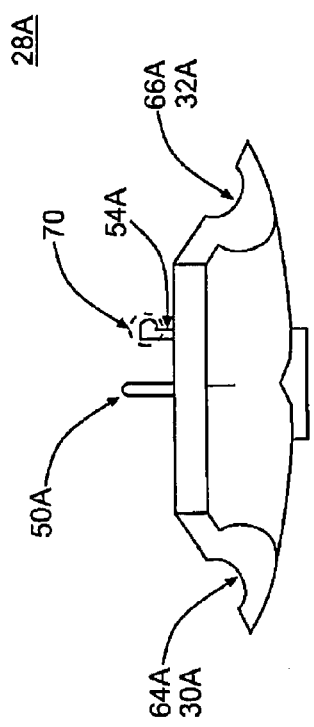

FIBER OPTIC CABLE FASTENER

FIELD OF THE INVENTION

The present invention relates to a fastener that joins a fiber optic cable with itself when woven into a net-like configuration or other types of configurations. The present invention also may be applied to join a plurality of optic fiber cables together in a net-like configuration or other types of configurations.

BACKGROUND OF THE INVENTION

In the field of security fences, in particular, fasteners, sometimes referred to as "buttons," are used to join or bundle a single fiber optic cable or multiple fiber optic cables together in a net-like configuration. Buttons may be configured with grooves or channels to accommodate the outer circumference of the fiber optic cables to avoid pinching or crushing optical cables, when joined. In most applications, the buttons typically comprise two halves, which are joined together.

In applications involving seurity fences, it is desirable to have the buttons remain permanently closed and in place once the fiber optic cable or cables are joined to prevent the buttons from being removed, once positioned. To assure that the buttons cannot be removed, the two portions of the buttons are usually subjected to a sealing process. That is, the two portions are either fused together by a heat treatment or ultrasonically welding or, in some cases, permanently adhered together, to yield a unified, sealed junction that is virtually incapable of being opened or unfastened.

Where security fences are involved, it is desirable for the buttons to be permanently secured so that an intruder cannot remove the buttons and, thereby, attempt to breach or to breach the perimeter secured by the fence. If not secured, it is theoretically possible that an intruder might be able to remove several of the buttons without triggering an alarm. If so, the intruder theoretically could establish a hole in the security fence so that a person could pass therethrough.

As would be appreciated by those skilled in the art, the measures used in permanently joining fiber optic cables not only complicates and delays the fabrication and assembly process, it increases costs as well.

Accordingly, a need has developed for a fastener, or "button," that does not require a plurality of steps to secure the fastener to the fiber optic cable or multiple fiber optic cables.

However, security concerns remain a paramount concern that cannot be overlooked.

SUMMARY OF THE INVENTION

The present invention solves many of the difficulties recognized as failings in the prior art.

In particular, the present invention provides a construction that greatly simplifies the attachment of fiber optic fasteners to fiber optic cables, especially when the fiber optic cables are woven in a net-like configuration.

Morover, the present invention provides a construction for fiber optic fasteners with tamper-resistant features.

In one embodiment, the present invention sets forth a fastener for joining fiber optic cables, comprising a first segment having a first plurality of grooves to accommodate portions of the fiber optic cables, a first plurality of posts, a first plurality of apertures, and a first raised contoured portion. The fastener further comprises a second segment having a second plurality of grooves to accommodate portions of the fiber optic cables, a second plurality of posts, a second plurality of apertures, and a second raised contoured portion. The first plurality of posts of the first segment cooperates with the second plurality of apertures of the second segment and the second plurality of posts of the second segment cooperates with the first plurality of apertures of the first segment to secure the first and second segments to each other to form the fastener. The first and second raised contoured portions are configured to damage the fiber optic cables if the fastener is tampered with.

Other advantages of the invention will become apparent from the description that follows and from the drawings appended hereto.

DESCRIPTION OF THE DRAWINGS

The drawings appended hereto are intended to assist in the discussion of the invention and are not intended to be limiting of the invention. Where appropriate, like reference numerals refer to like structures and components, in which:

FIG. 5C is a side view of one segment comprising the secure fiber optic cable fastener with a routed fiber optic cable, in accordance with an embodiment of the present invention; and FIG. 6 is a side view of one segment comprising the secure fiber optic cable fastener, in accordance with an embodiment of the present invention.

DESCRIPTION OF THE INVENTION

Embodiments of the present invention will be described and depicted in association with the invention described and discussed in co-pending U.S. patent application Ser. No. 10/965,191, entitled "OPTIC FIBER SECURITY FENCE SYSTEM" filed on Oct. 15, 2004, the contents of which are hereby incorporated by reference in its entirety. It will be appreciated that the disclosed embodiments of the present invention as well as the application of the present invention to the referenced co-pending application are intended to be illustrative only and are not meant to be limiting of the scope of the invention.

Figure 1:
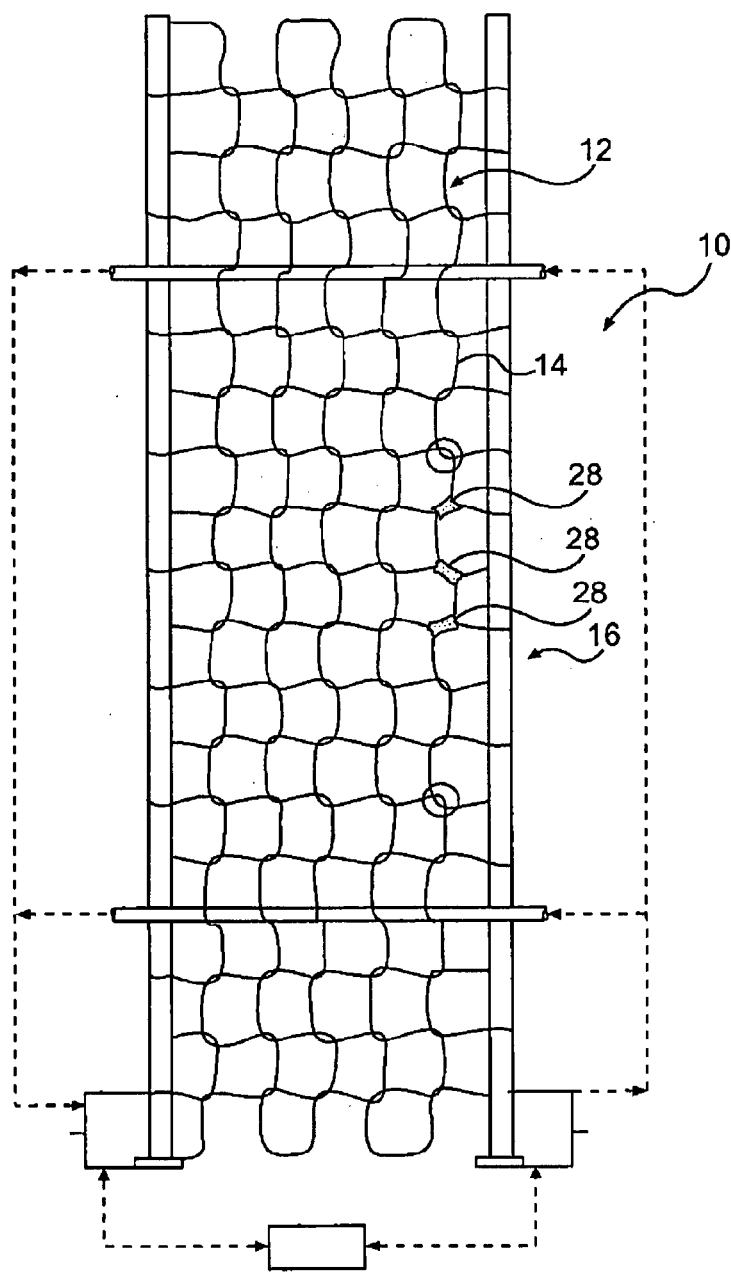
FIG. 1 is a front plan view of one embodiment of a optic fiber net portion, in association with an embodiment of the present invention.

Stated briefly, U.S. patent application Ser. No. 10/965,191 discloses a fiber optic security system 10 that functions as a security barrier. As illustrated in FIG. 1, the system 10 employs an optic fiber net 12 that comprises, inter alia, a fiber optic cable 14 woven in a pattern such that the fiber optic cable 14 forms the fiber optic net 12. As such, the optic fiber net 12 is constructed to form a continuous, unbroken fabric. The security system 10 is configured in a manner such that, if any portion of the fiber optic cable 14 comprising the net 12 is cut, broken, or otherwise damaged, a breach is detected, triggering a corresponding alarm.

Because the optic fiber net 12 may be constructed to have any suitable dimensions sufficient to cover any desired area, the fiber optic cable 14 may be alternatively woven into a plurality of individual panels 16 that may be optically (or electronically) connected to one another to form a continuous fiber optic screen around the perimeter of the area to be protected.

Figure 2:
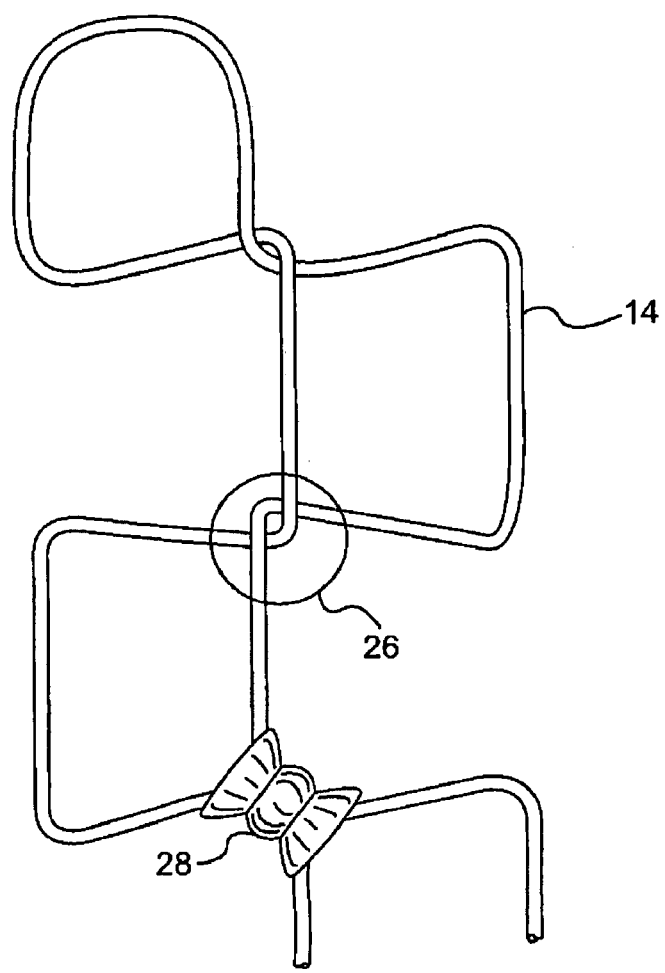
FIG. 2 is an enlarged front view of a portion of the optic fiber net portion, in association with an embodiment of the present invention.

As better illustrated in FIG. 2, the junctures 26 between the fiber optic cable 14 may be provided with a fastener 28. The fastener 28 which, as noted above, may also be referred to as a "button," is configured to join portions of the fiber optic cable 14 where the cable 14 crosses itself at the junctures 26. Moreover, for larger installations, the buttons 28 may equally be applied to join a plurality of individual panels 16 discussed above, or segments thereof.

Given the intended purpose of fiber optic security system 10, the buttons 28 are configured to be secure buttons 28. That is, the buttons 28 are configured to provide a tamper-resistant junction that is virtually incapable of being opened, removed, or repositioned without breaking or damaging the joined fiber optic cables 14 or the joined portions thereof.

Figure 3:
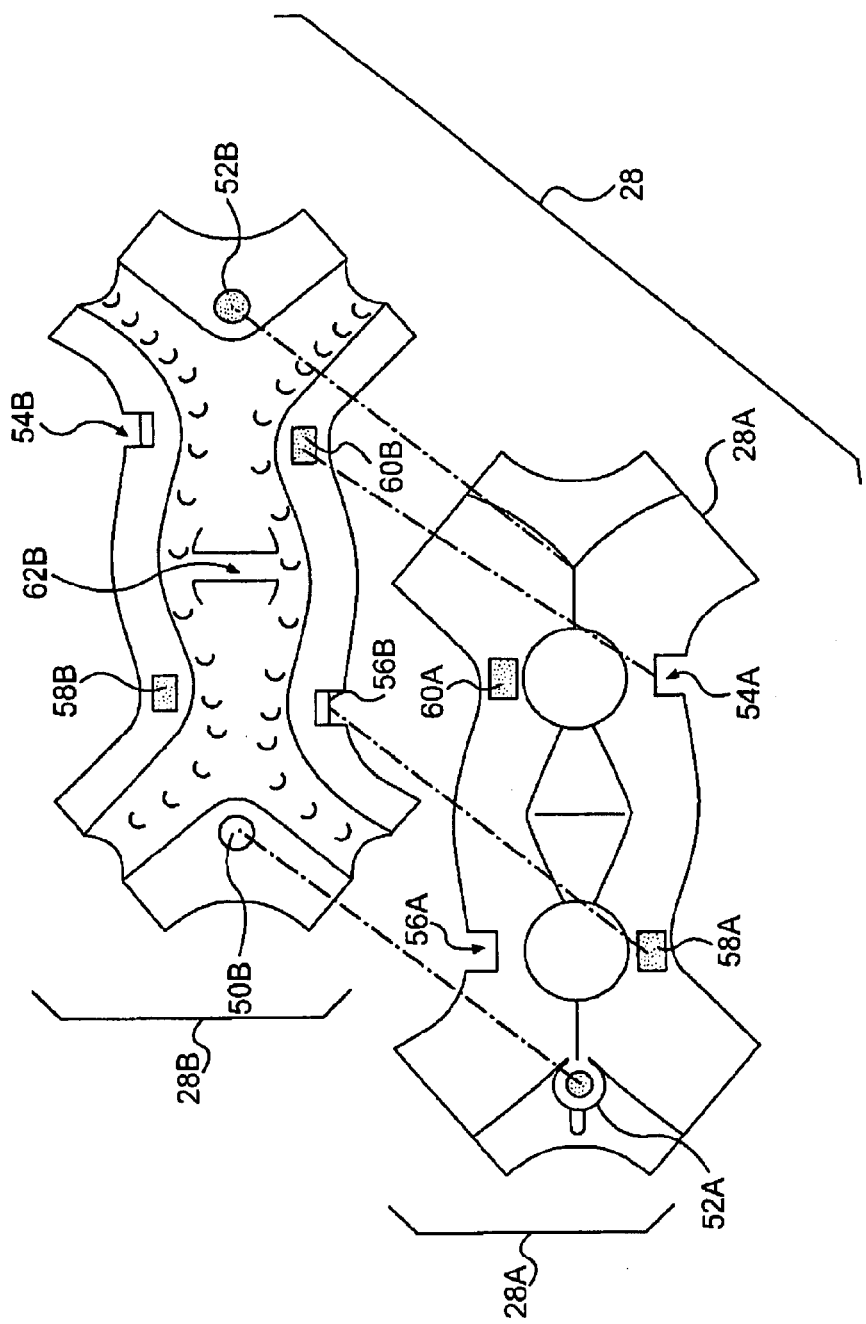
FIG. 3 is a perspective view of the two segments comprising the secure fiber optic cable fastener, in accordance with an embodiment of the present invention.

FIGS. 3–6 depict the configuration and structure of the secure buttons 28, in accordance with embodiments of the present invention. FIG. 3 depicts button segments 28A and 28B which, when assembled together, comprise the secure button 28. It will be appreciated that button segments 28A and 28B may be made from any suitable material including plastic, metal, a composite material, etc. Preferably, the button segments 28A and 28B are made from a thermoplastic material that may be readily and securely adhered to itself via suitable means including but not limited to an adhesive (such as an epoxy) or ultrasonic welding.

As shown, the secure button 28 and, thus, the button segments 28A, 28B are configured to accommodate and join two portions of the same fiber optic cable 14 or two distinct fiber optic cables 14. It will be appreciated that such a configuration is for illustrative purposes only, as the button 28 can be easily configured to accommodate and join more fiber optic cables 14 and/or portions thereof, if desired or if required by the particular installation.

As will be evident by the figures and ensuing description, the button segments 28A and 28B are substantially identical to each other except that, during the assembly process, one of the segments 28A, 28B is rotated 180° so that oppositely-gendered features of the respective segments 28A, 28B mate with each other to lock in and provide a tamper-resistant juncture. This is illustrated by FIG. 3, which shows the outer portion of the button segment 28A and the inner portion of the button segment 28B and depicts, at least in part, how the features of the segments 28A, 28B mate with each other.

Figure 4:
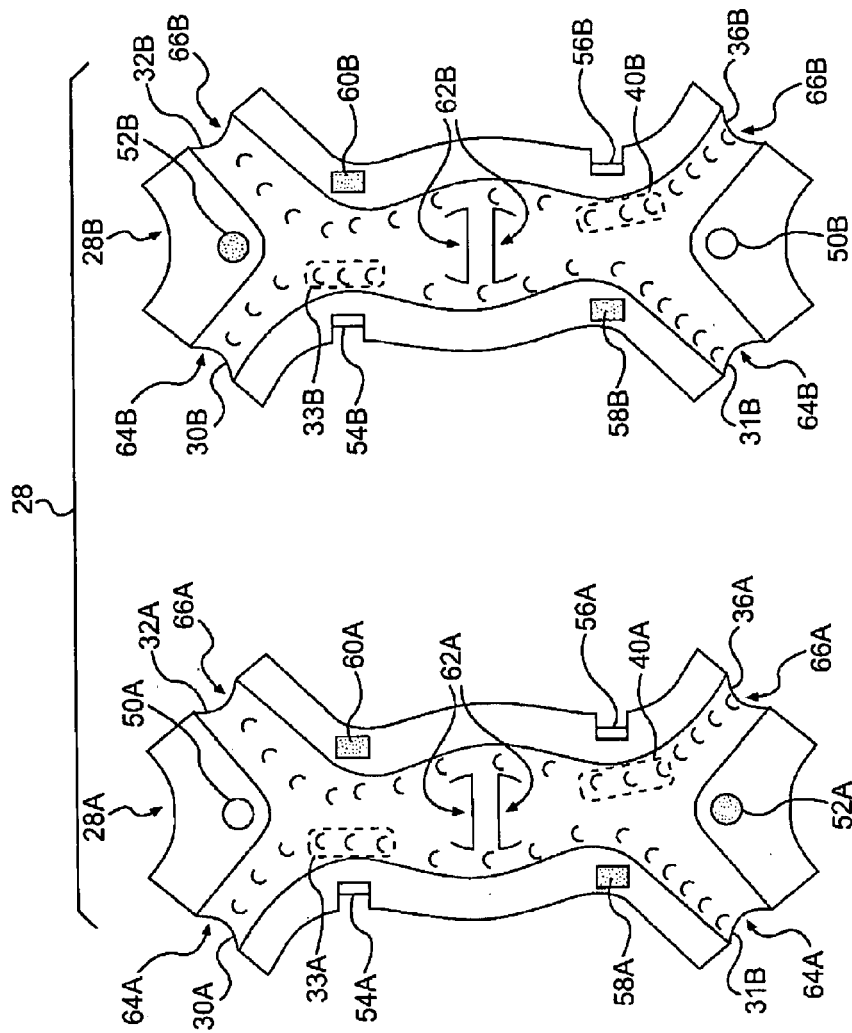
FIG. 4 is an interior plan view of the inner portions of the two segments comprising the secure fiber optic cable fastener, in accordance with an embodiment of the present invention.
Figure 5A:
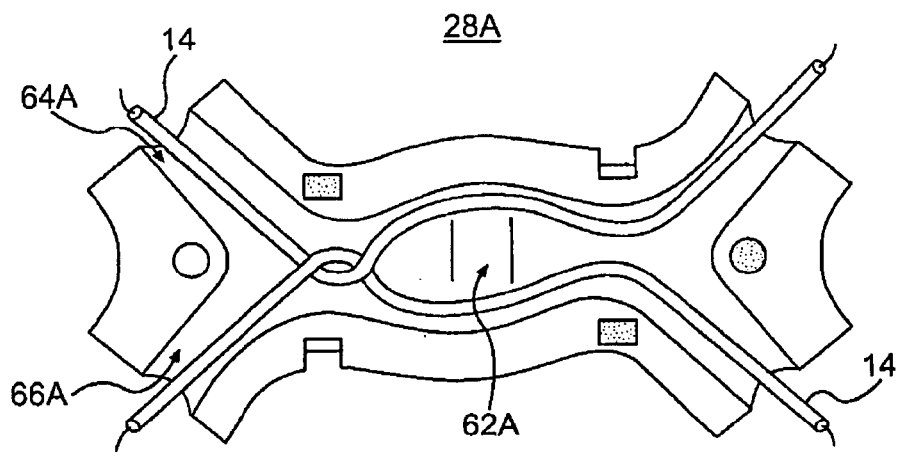
FIGS. 5A, 5B are front views of the inner portion of one segment comprising the secure fiber optic cable fastener with a routed fiber optic cable, in accordance with an embodiment of the present invention.

FIG. 4 provides a more detailed view of the inner portions of the button segments 28A, 28B. By way of illustration, the button segments 28A, 28B are each provided with two grooves 64A, 66A and 64B, 66B, respectively. As shown in FIG. 5A, for segment 28A, the grooves 64A, 66A, provide a routing path for the joined fiber optic cables 14 or portions thereof within the segments 28A, 28B. Each of the grooves 64A, 66A and 64B, 66B are configured so that, when the segments 28A, 28B are assembled together to form the secure button 28, the grooves 64A, 66A and 64B, 66B form channels to accommodate the outer circumference of the joined fiber optic cables 14 or portions thereof.

As shown in FIG. 4, the segment grooves 64A, 66A and 64B, 66B define ingress ports 30A, 32A and 30B, 32B, respectively, and egress ports 34A, 36A, and 34B, 36B, respectively. The segment grooves 64A, 66A and 64B, 66B are provided with a series of protrusions 38A, 40A, and 38B, 40B, respectively, that press into the outer cladding of the joined portions of the fiber optic cables 14 to provide a friction holding force that prevents the secure button 28 from slipping or sliding along the fiber optic cables 14, when the segments 28A, 28B are assembled together to form the button 28.

The inner portions of the button segments 28A, 28B may each be provided with raised contoured portions 62A, 62B, respectively, located proximate to the center of the segments 28A, 28B. As best seen in FIG. 5C, which depicts a side view of FIG. 5A, as the fiber optic cables 14 or portions thereof are routed along grooves 64A, 66A and 64B, 66B, respectively, the raised contoured portions 62A, 62B operate to lift the cables 14 around the center of the segments 28A, 28B. In this manner, when the segments 28A, 28B are assembled together to form the button 28, the raised fiber optic cables 14 exert an outwardly extending force on the inside surfaces of the segments 28A, 28B, respectively.

Figure 5B:
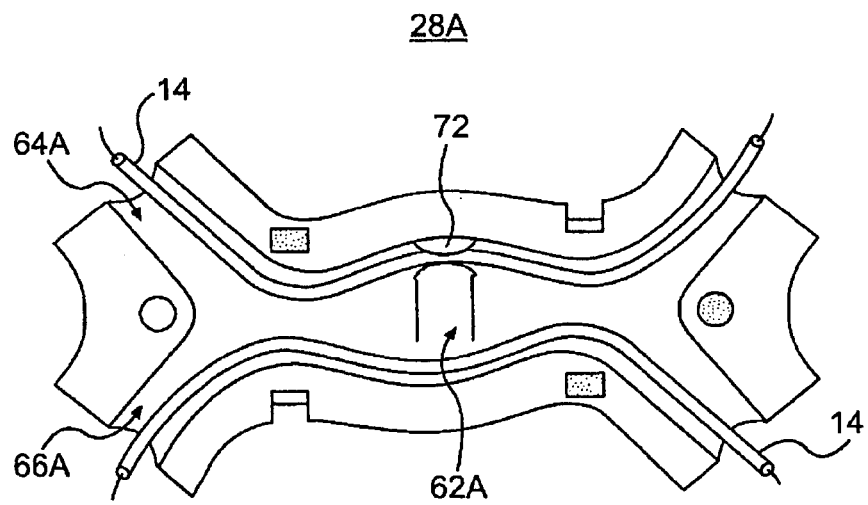

Moreover, as best seen in FIG. 5B, the raised contoured portions 62A, 62B may also be configured with nubs or other formations 72 that serve to pinch or otherwise wedge the portions of the fiber optic cables 14 into place.

FIG. 5A illustrates a front view of the inner portion of the segment 28A with the portions of the fiber optic cable 14 being connected or woven with one another, as discussed above relative to FIGS. 1 and 2. However, it is contemplated that, in other embodiments, as shown, for example, in FIG. 5B, the portions of the fiber optic cable 14 may not be interwoven, relying instead on the features and structural integrity of the assembled secure button 28 to securely couple the portions of the fiber optic cable 14.

Moreover, the inner portions of the button segments 28A, 28B may each be provided with locking posts 54A, 56A and 54B, 56B and locking apertures 58A, 60A, and 58B, 60B, respectively. The locking posts 54A, 56A, 54B, 56B and locking apertures 58A, 60A, 58B, 60B mate to securely fasten the segments 28A, 28B together to form the secure button 28. As better illustrated in FIG. 6 with respect to the locking post 54A of the segment 28A, each of the locking posts 54A, 56A, 54B, 56B include a sloped head portion 70 with an outwardly extending lip. The sloped head portion 70 facilitates entry of the locking posts 54A, 56A, 54B, 56B with the respective locking apertures 58A, 58B, 60A, 60B.

During assembly, as shown in part in FIG. 3, the sloped head portion 70 of the locking posts 54A, 56A of segment 28A penetrates the respective locking apertures 60B, 58B of the segment 28B. Similarly, the sloped head portion 70 of the locking posts 54B, 56B of the segment 28B penetrates the respective locking apertures 60A, 58A of the segment 28A. To join the button segments 28A, 28B, the segments 28A, 28B are pushed together to overcome the outwardly extending force on the inside surfaces of the segments 28A, 28B. In this way, the locking posts 54A, 56A, 54B, 56B are pushed through the respective locking apertures 58A, 60A, 58B, 60B so that the outwardly extending lip of sloped head portion 70 catches the lower ridge of the apertures 58A, 60A, 58B, 60B.

Once the head portion 70 of locking posts 54A, 56A, 54B, 56B catches the lower ridge of the apertures 58A, 60A, 58B, 60B, the outwardly extending force on the inside surfaces of the segments 28A, 28B provides the necessary pressure to lock the button segments 28A, 28B securely together to form the secure button 28 without the use of subsequent any sealing processes. In other words, the segments 28A and 28B are press-fit or snap-fitted to one another.

To make secure button 28 tamper-resistant, the raised contoured portions 62A, 62B of the segments 28A, 28B may be configured and arranged to impart a predetermined local pressure on the joined fiber optic cables 14 or portions thereof. The local pressure should be sufficient to damage or break the joined fiber optic cables 14 or portions thereof, if the secure button 28 is tampered with after assembly. For example, attempts at prying, twisting, or otherwise forcing the secure button 28 open, results in the damage or breaking of the joined fiber optic cables 14, thereby interrupting the communications transmitted by the cables 14. The interrupt in communications can be easily detected. In this manner, the secure button 28 provides a secure, tamper-resistant juncture.

To facilitate the assembly of the secure button 28, the inner portions of the button segments 28A, 28B may each be provided with a guide post 50A, 50B, respectively, and a guide aperture 52A, 52B, respectively. The guide posts 50A, 50B and guide apertures 52A, 52B operate to easily ensure the proper alignment of the segments 28A, 28B to each other during assembly to form the secure button 28. That is, as better illustrated in FIG. 3, the guide post 50B of the segment 28B is aligned and mates with the guide aperture 52A of the segment 28A during assembly. Similarly, the guide post 50A (not shown) of segment 28A is aligned and mates with the guide aperture 52B of the segment 28B during assembly. In this manner, after the guide posts 50A, 50B and guide apertures 52A, 52B are aligned, the segments 28A, 28B can simply be pushed together to join and lock the button segments 28A, 28B to form the secure button 28.

In the construction of the optic fiber net 12, it is preferred that the fiber optic cable 14 first be woven into a net-like configuration before the secure buttons 28 are attached thereto. The optic fiber net 12, once woven, retains its woven shape much like a sweater retains its shape despite being woven from a single strand of yarn. Since the optic fiber net 12 retains it woven configuration without the placement of secure buttons 28 thereon, the placement of the buttons may be altered from one installation to another. Specifically, in one contemplated embodiment, a secure button 28 is placed at each juncture 26 where the fiber optic cable 14 crosses itself in the optic fiber net 12. However, to reduce the cost of manufacture and to reduce the overall weight of the optic fiber net 12, it is contemplated that other embodiments will not include a secure button 28 at each juncture 26. In these contemplated variations, the secure buttons 28 may be placed in a pattern of selected ones of the junctures 26. For example, it is contemplated that the secure buttons 28 will be placed at every other juncture 26, thereby reducing the number of buttons used to half that of the previous example. Other patterned variations are also contemplated as would be appreciated by those skilled in the art. In still another variation, it is contemplated that the secure buttons 28 will be positioned randomly on the optic fiber net 12 and not follow a particular pattern.

While the security system 10 of the present invention has been described in connection with specific embodiments thereof, the present invention is not intended to be limited solely to the embodiments described. As will be appreciated by those skilled in the art, elements of the invention may be altered from the specifics discussed above without departing from the scope and spirit of the invention. Moreover, it is intended that all equivalents that will be appreciated by those skilled in the art also fall within the scope of the present invention as discussed above and as recited by the claims appended hereto.

What is claimed is:

1. A fastener for joining portions of a fiber optic cable, comprising:
    a first segment having a first plurality of grooves to accommodate portions of said fiber optic cables, a first plurality of posts, a first plurality of apertures, and a first gradiently-raised contoured portion located proximate to the center of the first segment; and
    a second segment having a second plurality of grooves to accommodate portions of said fiber optic cables, a second plurality of posts, a second plurality of apertures, and a second gradiently-raised contoured portion located proximate to the center of the second segment;
    wherein said first plurality of posts of said first segment cooperates with said second plurality of apertures of said second segment and said second plurality of posts of said second segment cooperates with said first plurality of apertures of said first segment to secure said first and second segments to each other to form said fastener.

2. The fastener of claim 1, wherein said first and second gradiently-raised contoured portions are configured to impart a local pressure on the portions of the fiber optic cables, such that if said fastener is tampered with, the local pressure is sufficient to damage said fiber optic cables.

3. The fastener of claim 1, wherein said first and second plurality of grooves comprises two grooves.

4. The fastener of claim 1, wherein said first and second plurality of posts comprises two posts.

5. The fastener of claim 1, wherein said first and second plurality of apertures comprises two apertures.

6. The fastener of claim 1, wherein said first and second segment further comprise a guide post and a guide aperture.

7. The fastener of claim 1, wherein each of said first and second plurality of posts include a sloped head portion.

8. The fastener of claim 7, wherein the sloped head portions engage ridges surrounding corresponding apertures so that the first and second segments may be secured to one another in a snap-fitted arrangement.

9. The fastener of claim 1, further comprising a plurality of protrusions in at least one of the plurality of grooves to assist in securing the portions of the fiber optic cable therein.

10. The fastener of claim 9, wherein the plurality of protrusions are disposed in each of the grooves in the first and second segments.

11. The fastener of claim 1, wherein the first and second segments comprise a thermoplastic material.

12. The fastener of claim 8, wherein, after the first and second segments are joined, the first and second segments are further secured to one another via ultrasonic welding and/or an adhesive.

13. The fastener of claim 1, wherein the first and second segments are constructed to surround portions of the fiber optic cable that have been woven in a net-like configuration at junctures between the portions of the fiber optic cable.

14. The fastener of claim 1, wherein the portions of the fiber optic cable comprise plural fiber optic cables.

* * * * *